3,499,771
CONTROLLING THE GROWTH OF
BACTERIA IN MILK

Carolina Marx de del Pozo, Mexico City, Mexico, assignor to Genhal, S. A. de C. V., Mexico City, Mexico, a corporation of Mexico
No Drawing. Filed Apr. 9, 1965, Ser. No. 447,053
Claims priority, application Mexico, Apr. 15, 1964, 76,708
Int. Cl. A23c 9/08
U.S. Cl. 99—213      23 Claims

ABSTRACT OF THE DISCLOSURE

The growth of bacteria in raw milk is controlled by passing it in contact with chloro-bromo dimethyl hydantoin without taking measurable amounts of the chloro-bromo dimethyl hydantoin into solution in the milk.

---

The present invention refers to a new and improved process for decontamination of dairy products and more particularly to the decontamination of milk and milk products by treatment with a particular hydantoin, to a composition of matter for carrying out said process and to the process of preparation of said composition.

It is well known that hereinbefore the milk and milk products had to be subjected to a pasteurization process to kill bacteria and other germs, and that immediate cooling of the milk after milking was mandatory in order to avoid decomposition thereof prior to its arrival to the pasteurizing plant.

When the pasteurizing plant is in a place near the farm where the cows are milked, the problem of decomposition of milk under pasteurization is somewhat reduced, but this sometimes involves wrong locations of the industrial pasteurization plants. It is generally preferred to locate said pasteurizing plants within the urban limits or in well communicated zones in order to provide them with adequate facilities and therefore costly and complicated transportation equipment is necessary to convey the milk from the farm to the pasteurizing plant and to avoid decomposition thereof prior to pasteurization or in the process of pasteurization because of the decomposing action of the heat involved in said process.

On the other hand, there are certain zones, particularly in Latin-America and Eastern countries which lack suitable facilities to provide for the installation of pasteurizing plants so that some small towns and villages generally consume unpasteurized milk with the consequent possible damages caused to the consuming population.

Some disinfecting chemical products have been proposed for incorporation into the milk, but they have not found the favor of the consumer and the approval of the health departments, inasmuch as these chemical products constitute an adulterant for the milk and introduce an off-flavour which renders these products unpalatable to most of the consumers.

Therefore, it has been for long a need in the dairy products industry to find a process to aid or to substitute pasteurization of milk without the detectable incorporation of a disinfecting chemical product in the milk. It has also been the need of these industries to look for a germicidal type of chemical product having a killing strength sufficient to be effective in minute doses which will be practically undetectable by the common laboratory methods, which will not constitute an adulterant or a toxic chemical additive in view of the very minute proportions in which it is contained in the milk, and which will not introduce an off-flavour thereinto.

It is therefore an object of the present invention to provide a method for disinfecting milk and milk products in order to kill bacteria and other germs normally living therein, without the need of complicated equipment, which process can be carried out in the very milking place to avoid any decomposition of the milk on transportation to its destination.

Another object of the present invention is to provide a process of the above mentioned character which will avoid the low temperatures generally required for transportation of milk from the milking site to the pasteurizing plant or consumption point.

Another and more particular object of the present invention is to provide a disinfecting process of the above mentioned character, which merely comprises treating the milk as extracted from the udder of the cow by contacting it with a tablet of the composition of matter which forms another purpose of the present invention.

Accordingly, another object of the invention is to provide a composition of matter in the form of a pellet or tablet, highly useful for disinfecting milk and milk products as an aid to or as a substitute for the pasteurization process hereinbefore conventionally used.

The foregoing objects and others ancillary thereto are accomplished as follows:

According to a preferred embodiment of the invention, the milk and milk products are subjected to contact with a tablet or other physical form of a composition of matter comprising a substantial proportion of chloro-bromo dimethylglyclyl urea (chloro-bromo dimethyl hydantoin) of the formula:

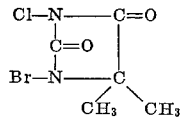

and a suitable binder therefor.

The passage of the milk through contact with the tablet is carried on at a rate such that the proportion of the above mentioned chemical product will be very small and for all practical purposes completely undetectable through laboratory quantitative methods.

The chemical reaction effected can be summarized as follows:

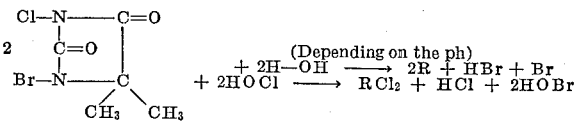

wherein R is the methylated radical of the hydantoin.

The product of the present invention cannot be considered as an adulterant because it does not affect the physical or chemical properties of the milk, and does not modify the dietetic properties thereof. It cannot be considered as a preserver because it does not alkalize the milk as is the case with all preservers conventionally used such as carbonates, bicarbonates, hydroxides, ammonia and the like. Finally, the product of the present invention cannot be considered as a toxic chemical additive because the amount thereof remaining in the milk is negligible and can hardly be chemically detected and also because the halogen derivatives and more particularly those comprising the couple chloro-bromo are quite tolerable to the human organism.

In accordance with a preferred embodiment of the invention, a germicidal decontaminating pasteurizing-like product comprising chloro-bromo dimethyl-glycolyl urea (chloro-bromo dimethyl hydantoin) is prepared by dissolving a suitable binder, preferably a gum such as gum arabic, gum tragacanth or other binders like carboxymethylcellulose or polyvinylpirrolidone (Plasdone) in a suitable solvent, such as an alkanol, e.g., ethanol, adding thereto a large proportion of the chloro-bromo dimethylglycolyl urea (chloro-bromo dimethyl hydantoin) which is thoroughly blended to form a paste-like mixture. The latter is thereafter granulated, dried and pelletized to tablets or pellets of a suitable size to be used as a contact element towards the milk.

In order to effect the process of decontaminating the milk, a number of these pellets is placed into a foraminous enclosure within a funnel-like receptacle and the milk is passed therethrough in order to contact the pellets which by the mere contact with the milk kill most of the bacteria and other germs naturally occurring in the milk as extracted from the udder of the cow.

It is highly recommendable that the decontaminating process is effected within four hours after the milking operation in order to provide for highest efficiency and killing ability of the chloro-bromo dimethyl-glycolyl urea (chloro-bromo dimethyl hydantoin).

The size of the funnel-like elements containing the foraminous enclosures for the hydantoin pellets can be varied within very wide limits in accordance with the capacity of the plant involved. The pellets can be arranged for larger plants, for example, within a cover plate provided with a plurality of foraminous enclosures and placed on top of a reception tank unto which the milk can be poured such that it can be passed through said foraminous enclosures to effect the desinfection thereof.

In accordance with the present invention, the decontamination process is preferably effected by using an amount of from about 10 to 20 gr., preferably 13 gr. of the product of the invention per about 30,000 l. of milk. As the flow of milk in contact with the tablet or tablets proceeds, the latter are gradually coated with a fatty layer which diminishes the efficiency of the tablet for killing bacteria. Thus, it has been found necessary to periodically stop the flow of milk and rinse the tablet or tablets by a stream of water, preferably shaking the containers for the tablets, in order to remove the fatty layer therefrom. It has been found that this operation should be effected after an amount of from 250 to 500 l. of milk have passed in contact with each batch of tablets, depending on the type of milk involved and on other environmental conditions in the processing room.

In accordance with the above, it will be clearly seen that the amount of germicidal product passing into the milk will be exceedingly small (of the order of $4 \times 10^{-4}$ gr. per liter). This amount is equivalent to a halogen concentration in the milk of about $6 \times 10^{-6}$ gr. per liter. It is therefore obvious that the decontamination process is effected by a mere contact of the milk with the tablet and that no residual cumulative power remains, so that the produced milk will have characteristics quite similar to pastuerized whole milk.

The decontamination process of the present invention must be effected on a fairly sweet milk, inasmuch as if undue lactic fermentation takes place so as to lower the pH value thereof below 5.8, the halogenated product of the present invention, while killing a sufficient amount of bacteria, will not be able to increase the pH of the milk which will then develop more acidity until it finally eventually breaks down.

As a practical matter, when more than one hour is to elapse from the time of milking the cow to the time of arrival to a pasteurizing plant, the milk must be treated by the method of the present invention at the milking place. When the transportation of the milk does not take as long as one hour or more, the milk can be decontaminated by the process of the invention upon arrival to the pasteurizing plant without the danger of developing the disadvantageous acid condition as above mentioned. It is however highly recommendable to treat the milk at the milking place both as a means for decontaminating the milk which will make pasteurization unnecessary, and such that a sufficient period of time is given to the transportation equipment to accomplish its function of conveying the milk from the milking place to the pasteurizing plant.

In the first case, it is generally preferred to wash the udder of the cow with a dilute solution of the product of the invention, drying and then milking as is customary. The milk is then poured through the funnel-like elements containing the chloro-bromo dimethyl-glycolyl urea (chloro-bromo dimethyl hydantoin) at a rate such that a proper amount of bacteria is killed, and the tablets of the product of the invention are periodically rinsed with water as above described.

The decontamination process as above described and carried out by using the germicidal product of the present invention, therefore, is highly useful in milk processing plants as a substitute to pasteurization or as an aid thereto. It will be clearly apparent to those skilled in the art that by thus treating the fresh milked product, the quality of the finished dairy product will be considerably enhanced due to the fact that the active product of the present invention will maintain the micro-organism content of the freshly extracted milk at a low value to avoid contamination thereof for a certain period of time. This is particularly important when the milk is to be transported from the milking place to the pasteurizing plant and more so if the time of transportation is above one hour.

In order to obtain a full understanding of the merits of the present invention, the following illustrative examples are given, which must not be construed as limitative of the present invention but merely as exemplary of particularly preferred embodiments thereof.

EXAMPLE I

An amount of milk obtained by manual milking without any aseptic precautions was sent to a pasteurizing plant and received there four hours after the time of milking.

Several samples were taken at the pasteurizing plant and treated in the following manner and with the following results:

(a) One of the samples was fed to the pasteurizing equipment seven hours after its arrival. This milk was of course completely spoiled by the pasteurizing treatment.

(b) Another sample was passed through a cooling screen thereby reducing its temperature from 30° C. down to 10° C. The sample was fed to the pasteurizing equipment, its temperature increasing on transportation (1.3 minutes) to 20° C. Ten hours after milking the pasteurization was started. The milk was also completely spoiled on this test.

(c) Another sample was cooled by the cooling screen as in (b) above, previously contacting it with an amount of chloro-bromo dimethyl hydantoin in a test tube (contaminated with dust and by insects) without a stopper and at room temperature (20 to 22° C.). After about fourteen hours, the pH of the milk was measured and it was found that the initial valve of 6.5 was preserved. The alcoholic preservation test was effected on this sample with negative results. At the boiling temperature the milk was not spoiled and it preserved its sweet taste. Upon cooling, a thick consistent scum was formed having normal flavour and odour.

EXAMPLE II

A sample of the milk obtained according to the first portion of Example I was filtered through a non sterile clean cloth where a tablet of chloro-bromo dimethyl hydantoin was placed. The thus treated milk was left aside for a period of sixteen hours at room temperature. After this period of time, the milk was tested as in Example I with very satisfactory results in preservation of chemical and physical properties and pH measurements.

EXAMPLE III 460 l. of milk were stored in a refrigeration chamber after treatment with the chloro-bromo dimethyl hydantoin and precooling in a cooling screen four hours after milking. The milk was contained in metallic cans which were kept at a temperature of about 15° C. After a period of twenty-two hours under refrigeration at the above temperature, a physical and chemical analysis was effected on a sample of milk. Very satisfactory results were obtained.

The milk was then sent to the pasteurizing plant on a non refrigerated truck, and was received 1.5 hours later at the pasteurizing plant at a temperature of about 23° C.

The pasteurization process was started 24 hours after milking. The duration of the pasteurizing treatment was of about two hours.

The 460 l. of milk were bottled and then sent on non refrigerated trucks to a distributing shop for sale to direct consumers. This trip took about 2 hours at a room temperature of around 27° C.

The bottles were then charged on distributing trucks and sent to the markets and house customers. The time elapsed from the milking time to the consumption time was of an average of about 53 hours. Some of the markets sold some remainders of the milk one day after reception, so that the time for consumption of the milk was increased still more.

All the bottles of milk were carefully traced by a group of experts in order to detect the slightest spoilage or deterioration thereof or any change of appearance within the bottles. The reports of the experts were all favorable and there was not a single bottle of milk which could be considered as having an off quality after the above mentioned period of time even when the variations in the temperatures were remarkably frequent and wide.

A small portion of the milk was subjected to the same operations except that it was not treated with the chloro-bromo dimethyl hydantoin of the present invention. All this portion of untreated milk was completely spoiled under the pasteurization treatment.

EXAMPLE IV

An amount of milk was extracted from the cow's udder without any aseptic conditions and the milk was passed through a funnel-like element containing a number of chloro-bromo dimethyl-hydantoin tablets. The thus treated milk was received in a glass flask washed with tap water. This milk was poured into 15 250 ml. Erlenmayer flasks and each flask was stoppered with a rubber stopper. The flasks were kept in a refrigerator at 120° C. and each of the samples was observed every 24 hours for its condition.

In each observation the flask was opened without any aseptic precaution under room temperature. pH measurements were effected every 24 hours.

The time elapsed for the milk to spoil starting from the milking time, was very high, never under 160 hours, as can be clearly seen in Table I:

| Sample No.: | Time to spoilage |
|---|---|
| 1 | 168 |
| 2 | 192 |
| 3 | 176 |
| 4 | 193 |
| 5 | 168 |
| 6 | 168 |
| 7 | 160 |
| 8 | 168 |
| 9 | 168 |
| 10 | 184 |
| 11 | 184 |
| 12 | 160 |
| 13 | 168 |
| 14 | 192 |
| 15 | 168 |

Another load of milk was treated in accordance with the above process with the exception that the step of decontaminating the milk with the chloro-bromo dimethyl hydantoin of the present invention was omitted. The milk was pasteurized instead. The results obtained are shown in the following Table II.

| Sample No.: | Time to spoilage |
|---|---|
| 1 | 72 |
| 2 | 96 |
| 3 | 80 |
| 4 | 96 |
| 5 | 72 |
| 6 | 80 |
| 7 | 64 |
| 8 | 72 |
| 9 | 72 |
| 10 | 88 |
| 11 | 80 |
| 12 | 64 |
| 13 | 72 |
| 14 | 96 |
| 15 | 72 |

The bacterial and germicidal power of the product of the present invention is illustrated by the following example.

EXAMPLE V 20 ml. of pasteurized milk were passed into contact with a tablet of chloro-bromo dimethyl hydantoin for about 1 minute, another sample of 20 ml. of the same pasteurized milk was not treated with the chloro-bromo dimethyl hydantoin. The treated and non treated milks were cultivated in Endo medium and incubated in petri dishes. A coli colony count was effected after 48 hours of incubation. The samples were cultivated under the dilutions and giving colony counts as expressed in the following table.

TABLE III

| Dilution | Treated milk (chloro-bromo dimethyl hydantoin) | Untreated milk |
|---|---|---|
| 1 ml., no dilution | 222–175 col./ml | Countless. |
| 1:10 | 21–38 col./ml | 91–77 col./ml. |
| 1:100 | 3–4 col./ml | 10–7 col./ml. |
| 1:1,000 | 2–1 col./ml | 1–1 col./ml. |

From the above Table I, it can be concluded that under a very large dilution, the treated milk could not be differentiated from the non treated milk. This is probably due to the fact that, as the milk is merely contacted with the chloro-bromo dimethyl hydantoin, the amount contained in the milk under this high dilutions is completely negligible and has no action whatsoever on micro-organisms. However, under moderate and low dilutions, the colony growth per mililiter of the treated milk is remarkably less than that obtained with the untreated milk.

From the above it can be seen that the process of contacting milk with chloro-bromo dimethyl hydantoin comprises very important advantages as compared to the pasteurization treatment as conventionally used hereinbefore.

The very simple manner in which the treatment of the present invention is effected enables the users to treat the milk immediately upon milking so as to avoid any possible damage thereto when the time between milking and consumption or pasteurization is unduly large. By treating the milk with the germicidal product of the present invention within a 4 hour period starting from the milking time, a very long life will be given to the milk for pasteurizing purposes or for direct consumption thereof without any sign of break down or spoilage.

The process of the present invention provides the additional advantages that a pasteurizing plant can be used by several farmers even when this pasteurizing plant is located at a reasonably large distance, inasmuch as after decontaminating the milk according to the process of the invention, a transportation time as long as 24 hours can be used without the danger of spoiling the milk when subjected to the heat used for pasteurization purposes.

On the other hand, even in very small, badly communicated towns, where pasteurization would be a luxury, the milk can be manually treated as extracted from the udder of the cow and pasteurization can be omitted without thereby supplying to the public an otherwise contaminated milk.

While the invention has been described in terms of certain preferred embodiments thereof, it is to be understood that many changes and modifications can be made by those skilled in the art without departing from the true scope and spirit of the invention, which will be only limited in accordance with the appended claims.

Having thus described my invention what I claim as new and wish to protect by Letters Patent is:

1. A process for controlling the growth of microorganisms in milk and milk products, which comprises treating the raw milk by passing the raw milk in contact with chloro-bromo dimethyl hydantoin at a rate sufficient to control the growth of microorganisms in the milk and maintain the proportion of chloro-bromo dimethyl hydantoin in the milk at a level substantially undetectable through laboratory quantitative methods.

2. A process for controlling the growth of microorganisms in milk and milk products, which comprises treating the raw milk by contacting it with a tablet of chloro-bromo dimethyl hydantoin by continuous flow past the tablet at a rate sufficient to control the growth of microorganisms in the milk and maintain the proportion of chloro-bromo dimethyl hydantoin in the milk at a level substantially undetectable through laboratory quantitive methods.

3. A process for controlling the growth of microorganisms in milk and milk products, which comprises treating the freshly milked milk by contacting it with a tablet of chloro-bromo dimethyl hydantoin at a rate sufficient to control the growth of microorganisms in the milk and maintain the proportion of chloro-bromo dimethyl hydantoin in the milk at a level substantially undetectable through laboratory quantitative methods, and then pasteurizing the thus treated milk.

4. A process for controlling the growth of microorganisms in milk and milk products, which comprises washing the udder of the cow with a dilute solution of chloro-bromo dimethyl hydantoin, milking the cow, passing the milk through a funnel containing one or more tablets of chloro-bromo dimethyl hydantoin at a rate sufficient to control the growth of microorganisms in the milk and maintain the proportion of chloro-bromo dimethylhydantoin in the milk at a level substantially undetectable through laboratory quantitative methods.

5. A process according to claim 4, wherein said tablets are periodically washed with water and wiped to completely remove the fatty layer which gradually builds up upon passage of the milk in contact therewith.

6. A process for controlling the growth of microorganisms in milk and milk products, which comprises washing the udder of the cow with a dilute solution of chloro-bromo dimethyl hydantoin, milking the cow, passing the milk through a funnel containing at least one tablet of chloro-bromo dimethyl hydantoin at a rate sufficient to control the growth of microorganisms in the milk and maintain the proportion of chloro-bromo dimethyl hydantoin in the milk at a level substantially undetectable through laboratory quantitative methods, periodically washing said tablets to maintain the germicidal power throughout the process and pasteurizing the thus treated milk.

7. A process according to claim 6, wherein said tablets are periodically washed with water and wiped to completely remove the fatty layer which gradually builds up upon passage of the milk in contact therewith.

8. A process according to claim 5, wherein said washing step is performed after passage of about 20 l. of milk per each gram of chloro-bromo dimethyl hydantoin contacted therewith.

9. A process according to claim 7, wherein said washing step is performed after passage of about 20 l. of milk per each gram of chloro-bromo dimethyl hydantoin contacted therewith.

10. A treated milk product containing an amount sufficient to control the growth of microorganisms but not more than about $6 \times 10^{-6}$ grams per liter halogen concentration obtained by contact with chloro-bromo dimethyl hydantoin.

11. The process according to claim 1 wherein said rate is sufficient to obtain a halogen concentration in the treated milk which is not more than about $6 \times 10^{-6}$ grams per liter.

12. The process according to claim 2 wherein said rate is sufficient to obtain a halogen concentration in the treated milk which is not more than about $6 \times 10^{-6}$ grams per liter.

13. The process according to claim 3 wherein said rate is sufficient to obtain a halogen concentration in the treated milk which is not more than about $6 \times 10^{-6}$ grams per liter.

14. The process according to claim 4 wherein said rate is sufficient to obtain a halogen concentration in the treated milk which is not more than about $6 \times 10^{-6}$ grams per liter.

15. The process according to claim 6 wherein said rate is sufficient to obtain a halogen concentration in the treated milk which is not more than about $6 \times 10^{-6}$ grams per liter.

16. A process for controlling the growth of microorganisms in raw milk, which comprises milking a cow to obtain the raw milk and treating the raw milk within not more than about four hours subsequent to milking by passing the raw milk in contact with tablets of chloro-bromo dimethyl hydantoin at a rate sufficient to control the growth of microorganisms in the milk and maintain the proportion of chloro-bromo dimethyl hydantoin in the milk at a level substantially undetectable through laboratory quantitative methods.

17. The process according to claim 16 wherein said rate is sufficient to obtain a halogen concentration in the treated milk which is not more than about $6 \times 10^{-6}$ grams per liter.

18. The process according to claim 16 wherein the treating step is initiated while the pH of the raw milk is greater than about 5.8.

19. A process for enhancing the storage life of milk, which comprises passing raw milk in contact with chloro-bromo dimethyl hydantoin within about four hours subsequent to extraction and before the pH of the raw milk is less than about 5.8, and then pasteurizing the milk the contact being at a rate sufficient to control the growth of microorganisms in the milk but insufficient to obtain a detectable level through laboratory quantitative methods of the hydantoin in the milk.

20. The process according to claim 19 wherein said rate is sufficient to obtain a halogen concentration in the treated milk which is not more than about $6 \times 10^{-6}$ grams per liter.

21. A process for controlling the growth of microorganisms in raw milk, which comprises forming slowly soluble tablets consisting of chloro-bromo dimethyl hydantoin and an inert binder, and contacting raw milk with such tablets at a rate sufficient to control the growth of microorganisms in the milk and maintain the halogen concentration in the milk at a level substantially undetectable through laboratory quantitative methods.

22. The process according to claim 21 wherein the halogen concentration in the milk does not exceed about $6 \times 10^{-6}$ grams per liter.

23. The process according to claim 21 wherein the tablets are used in amount of about 10–20 grams per 30,000 liters of milk.

References Cited

UNITED STATES PATENTS

| | | | |
|---|---|---|---|
| 2,130,805 | 9/1938 | Levine | 99—151 |
| 3,147,219 | 9/1964 | Paterson | 210—62 |

A. LOUIS MONACELL, Primary Examiner

D. M. NAFF, Assistant Examiner

U.S. Cl. X.R.

99—151